Patented June 3, 1952

2,598,660

UNITED STATES PATENT OFFICE 2,598,660

TRIPHENYLMETHANE DYES

Samuel A. Glickman, Easton, Pa., assignor to General Aniline & Film Corporation, New York, N. Y., a corporation of Delaware No Drawing. Application December 16, 1948, Serial No. 65,727

8 Claims. (Cl. 260—391)

The present invention relates to basic triphenylmethane dyestuffs and to a process for preparing them.

I have found new basic triphenylmethane dyestuffs characterized by unusually high solubility in water and alcohol type solvents. These products are of the general formula:

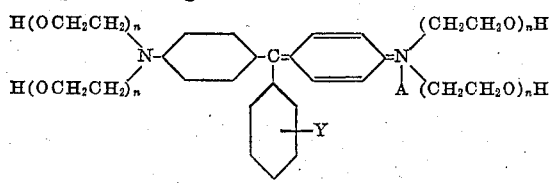

where $n$ is a small whole number from 2 to 10, where Y is hydrogen, lower alkyl (methyl, ethyl, propyl) halogen (chlorine, bromine), nitro, amino, alkylamino, bis - (2 - hydroxyethyl) - amino, sulfo, carboxyl, carbalkoxy, alkoxy; and where A is an anion of a strong mineral acid such as halide, sulfate, or phosphate or an internal linkage to Y when Y is sulfo or carboxyl. By $n$ averaging from 2 to 10 is meant that this will be the average an the total product which is a mixture wherein some $n$'s may be 1 and others may be, for example, 10 on different molecules or even on the two parts of the same molecule.

The preparation of these dyes involves the condensation of the respectively substituted aromatic aldehyde with the respective N,N-disubstituted aniline containing either one or two omega hydroxypolyoxaalkyl groups followed by oxidation in the usual manner with lead dioxide or manganese dioxide. The condensations are carried out in the presence of hydrochloric or sulphuric acids at temperatures at about 100° C. for several hours. The oxidation takes place preferably at 0 to 10° C. The following examples serve to illustrate the invention, but they are not intended to limit it thereto.

Example 1

Thirty-five parts by weight of 8,8'-phenyliminobis-3,6-dioxa-1-octanol as obtained by treating aniline with ethylene oxide as described in U. S. Patent 2,161,322, is stirred together with 6 parts by weight of benzaldehyde and 20 parts by weight of concentrated hydrochloric acid for 24 hours at 100° C. The reaction mixture is diluted with water and the leuco compound, p,p' - benzylidene-bis[N,N - bis(8-hydroxy-3,6-dioxaoctyl) aninline] with the formula given below:

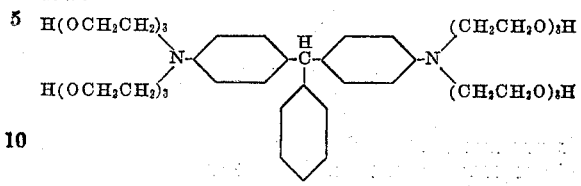

is oxidized with the calculated equivalent quantity of lead dioxide paste at a temperature in the range from 0–5° C. The green solution thus formed is treated with 15 parts by weight of sodium sulfate, filtered to remove lead sulfate thus formed, and the solution evaporated. The dye is separated from any inorganic salts by means of absolute alcohol. The final product is a viscous green material possessing excellent solubility with water and the lower alcohols and is believed to have the following formula:

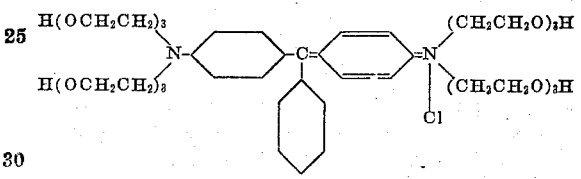

4 - [p - bis(8 - hydroxy- 3,6 -dioxaoctyl) amino-α-phenylbenzylidene] - 2,5-cyclohexadienylidene-[bis(8 - hydroxy-3,6-dioxaoctyl)]imonium chloride.

Example 2

The dye corresponding to the formula:

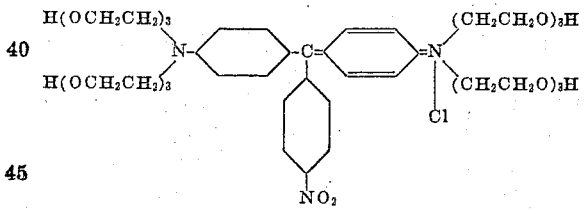

is produced by condensing and oxidizing in the above manner a mixture of 35.0 parts of 8,8'-phenyliminobis-3,6-dioxa-1-octanol, 8.2 parts of para nitrobenzaldehyde and 20 parts of concentrated hydrochloric acid. The dye is obtained as a tacky green solid.

Example 3

The dye corresponding to the formula:

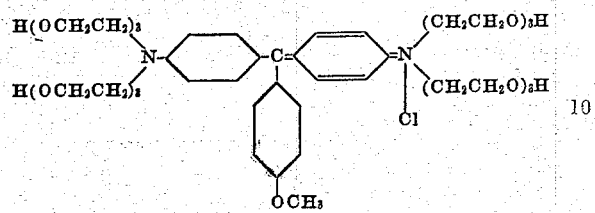

is produced by condensing and oxidizing in the above manner a mixture of 35.0 parts of 8,8'-phenyliminobis-3,6-dioxa-1-octanol, 7.5 parts by anisaldehyde and 20.0 parts of concentrated hydrochloric acid. The dye is obtained as a tacky green solid.

Example 4

The dye corresponding to the formula:

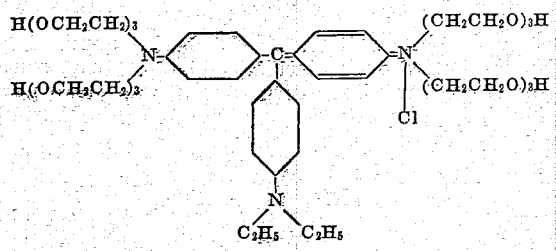

is produced by condensing and oxidizing in the above manner a mixture of 35.0 parts of 8,8'-phenyliminobis-3,6-dioxa-1-octanol, 8.9 parts of para diethylaminobenzaldehyde and 25.0 parts of concentrated hydrochloric acid. The dye is obtained as a viscous violet oil.

Example 5

The dye corresponding with the formula below is:

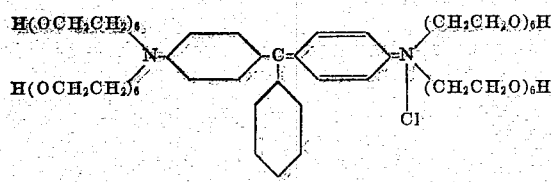

produced in a manner similar to the above by the condensation and oxidation of the mixture from 60 parts of 17,17'-phenyliminobis-3,6,9,12,15-pentaoxa-1-heptadecanol, 6 parts of benzaldehyde and 20 parts of concentrated hydrochloric acid. The dye is obtained as a viscous green oil, which is completely miscible with water, methanol and ethanol.

Example 6

The dye corresponding with the formula:

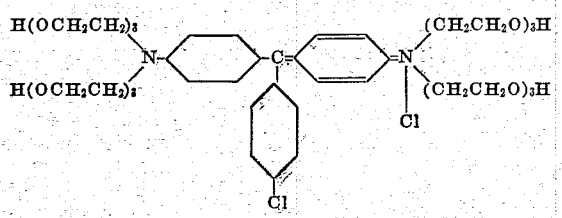

is produced by condensing and oxidizing in the above manner a mixture of 35.0 parts of 8,8'-phenyliminobis-3,6-dioxa-1-octanol, 7.7 parts of para chlorobenzaldehyde and 20.0 parts of concentrated hydrochloric acid. The dye is obtained as a viscous green liquid.

Examples of aromatic aldehydes which may be reacted with N,N-disubstituted aniline containing either one or two omega hydroxypolyoxaalkyl groups includes the following:

Benzaldehyde
Vanillin
o, m, or p-Tolualdehyde
p-Cyanobenzaldehyde
o, m, or p-Chlorobenzaldehyde
p-Hydroxybenzaldehyde
m-Nitrobenzaldehyde
p-Nitrobenzaldehyde
m-Sulfobenzaldehyde
o, m, or p-Sulfobenzaldehyde
o or p-Carboxybenzaldehyde
p-Anisaldehyde
m-Sulfo Anisaldehyde
Piperonal
p-Diethylaminobenzaldehyde Examples of tertiary aromatic amines which may be employed are:

N - Methyl - N - (11-hydroxy-3,6,9-trioxaonadecyl) aniline
N - Ethyl - N-(17-hydroxy-3,6,9,12,15-pentaoxaheptadecyl) aniline
14,14' - Phenyliminobis - 3,6,9,12 - tetraoxa - 1-tetradecanol The above amines may be obtained from aniline and N-alkylanilines on treatment with ethylene oxide as described in U. S. P. 2,161,322. The compounds so obtained are undoubtedly a mixture whose average composition is given above and are employed as such in the preparation of these novel dyes.

It will be understood that the polyoxyethylene groups may not be equally distributed on the two nitrogen atoms of the two aniline molecules but the total number should fall within the average of 2 to 10 for each of the anilino groups.

Dyes of the present invention when Y is attached meta or para are suitable for the manufacture of filter layers and anti-halation layers for photographic purposes. In this use they possess the advantage over conventional dyes in that they may be employed in both gelatin and alkali-soluble resin layers by virtue of their high solubility of water and alcohol type solvents. Further, these dyes are readily and completely decolorized by alkaline photographic developers and are readily removed from photographic layers containing the decolorized material.

A number of these dyes are viscous oils, miscible with water and glycerin, and are useful in the formulation of printing inks and pastes. In this connection, the advantageous waxy viscous non-crystalline nature of the dyes is attributed to the polyoxyethylene chains. The dyes are colored green and violet in acid and neutral solution depending on the number of chromophoric groups—green for two para-substituted chromophores and violet for three para-substituted chromophores.

By virtue of their solubility in organic solvents, dyes of the above classification are useful in the dyeing of plastics and the formulation of lacquers. They are useful as throwster dyes (bleachable dye for transitory marking) in the field of textiles. They may also be employed in other situations where fugitive dyes are required. Thus they function as indicators and are colorless in alkaline solutions (above pH 9) and colored in acid-neutral media.

What I claim is:

1. A new composition of matter comprising

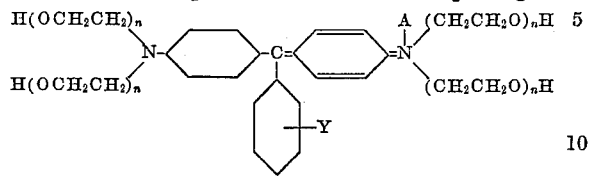

wherein $n$ is a small whole number from 2 to 10, wherein Y is selected from the group consisting of hydrogen, lower alkyl, halogen, nitro, aminoalkyl, amino bis-2 hydroxy ethyl amino, sulfo, carboxyl, carbalkoxy and alkoxy, and where A is an anion of a strong mineral acid.

2. A new composition of matter comprising

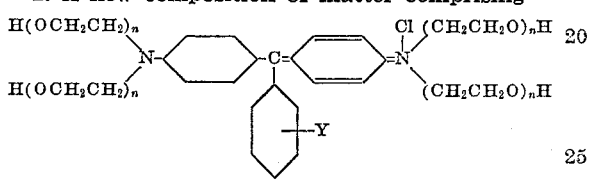

wherein $n$ is a small whole number from 2 to 6, wherein Y is selected from the group consisting of hydrogen, lower alkyl, halogen, nitro, aminoalkyl, amino bis-2 hydroxy ethyl amino, sulfo, carboxyl, carbalkoxy and alkoxy.

3. A new composition of matter having the following formula:

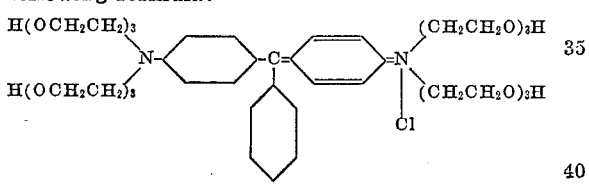

4. A new composition of matter having the folowing formula:

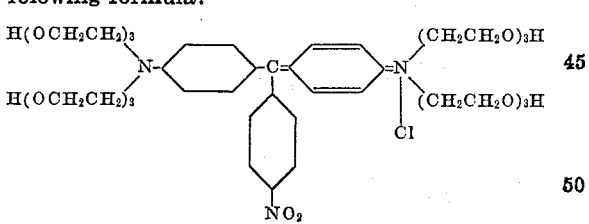

5. A new composition of matter having the following formula:

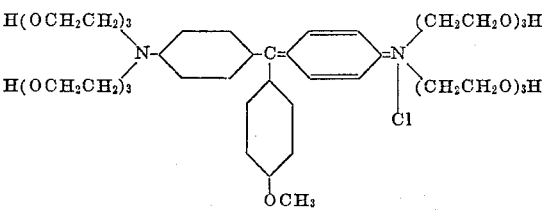

6. A new composition of matter comprising the leuco form of the dyestuff of claim 1.

7. A new composition of matter having the following formula:

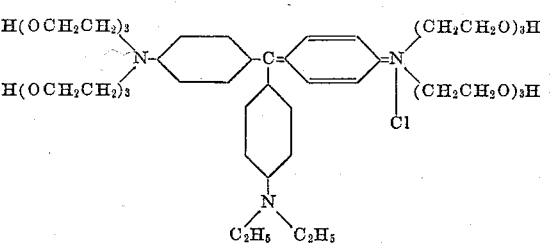

8. A new composition of matter having the following formula:

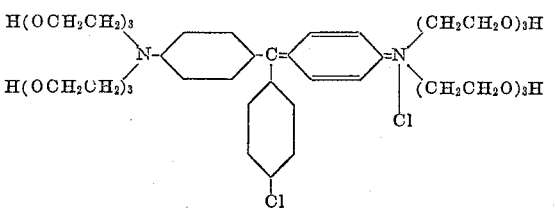

SAMUEL A. GLICKMAN.

REFERENCES CITED

The following references are of record in the file of this patent:

UNITED STATES PATENTS

| Number | Name | Date |
|---|---|---|
| 1,149,575 | Gartner et al. | Aug. 10, 1915 |
| 1,898,523 | Boger et al. | Feb. 21, 1933 |
| 2,091,463 | Wolff et al. | Aug. 31, 1937 |
| 2,161,322 | Steindorff et al. | June 6, 1939 |